APPARATUS FOR INVESTIGATING MAGNETIC
REGIONS IN THIN MATERIAL LAYERS
Filed Jan. 9, 1963

Inventor.
Ekkehard Fuchs.
By. [signature] Atty.

United States Patent Office
3,401,261
Patented Sept. 10, 1968

3,401,261

APPARATUS FOR INVESTIGATING MAGNETIC REGIONS IN THIN MATERIAL LAYERS

Ekkehard Fuchs, Munich, Germany, assignor to Siemens Aktiengesellschaft, a corporation of Germany Filed Jan. 9, 1963, Ser. No. 250,420
Claims priority, application Germany, Jan. 23, 1962, S 78,041
8 Claims. (Cl. 250—49.5)

Figure 1:
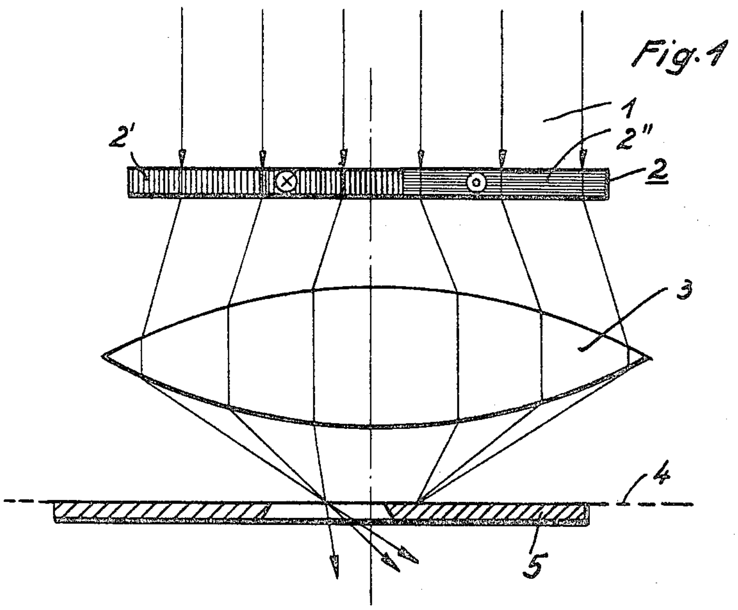

The invention disclosed herein is concerned with the investigation, with the aid of a corpuscular ray optical microscope, of magnetic regions in thin layers. The designation "thin layers" is intended to mean layers which will permit the passage of radiation therethrough (transirradiation).

The magnetic regions in a material are known as Weiss' sections, and in the material to be investigated, represent homogeneous magnetic regions. Since the direction of the magnetization fluctuates statistically from region to region, the material appears, in the absence of an exterior magnetic field, outwardly non-magnetic. The magnetizations of the Weiss' sections, which are quantitatively similar but statistically distributed as to the directions thereof, are also referred to as spontaneous magnetizations. In the magnetization of the Weiss' sections by an external field, in connection with materials which are here of interest, the directions of the spontaneous magnetizations are more or less oriented in the direction of the exterior field, a completely aligned orientation being obtained in the case of saturation.

Only a purely qualitative result can be obtained with the aid of known corpuscular ray optical methods, for example, the method of defocused picturing of magnetic regions. This method proceeds from the fact that the partial beam bundles of the total beam directed upon the layer which is to be examined, which partial beam rays permeate the various Weiss' sections, are also deflected in different directions owing to the different directions of the spontaneous magnetizations. Since the Weiss' sections are relatively large (several microns), it is possible to make the borders of the section visible, for example, in an electron microscope, by partial overlapping of adjacent partial beam rays, provided that the focusing is effected, not with respect to the plane of the thin layer which is to be examined and in which the distribution of the electrons is still homogeneous, over the cross-sectional area of the electron beam, but is directed upon a plane lying behind the layer, as viewed in the direction of the electron beam. So far as the layer is concerned, there is thus effected a defocused picturing.

The borders of the adjacent Weiss' sections appear in the electon microscope image partly as bright and partly as dark lines. Bright lines are obtained where an intensity increase appears as a result of the overlapping of the partial beam ray, while dark lines are produced at the places at which the partial beam rays permeating the Weiss' sections are deflected in the sense of mutual repulsion, owing to opposite directions of the spontaneous magnetizations of the adjacent sections.

In order to make it possible to carry out investigations which can be evaluated quantitatively, it has been proposed to produce, in conjunction with the defocused picturing, a homogeneous magnetic field, by means of a Helmholtz coil combination disposed in the specimen plane of the microscope, consisting of ring coils with the coil radius equal to the coil spacing, and to examine the material under the influence of this magnetic field.

Another known method for investigating the magnetic regions in thin layers, which likewise produced until now purely qualitatively evaluable results, operates with schlieren optical beam course.

The present invention is concerned with the problem, proceeding from the known schlieren optical beam course, to create with the aid of a corpuscular ray optical microscope, a possibility of also carrying out investigations of magnetic regions in thin layers, which can be evaluated quantitatively.

Further details of the invention will appear from the description which is rendered below with reference to the accompanying drawing.

Figure 2:
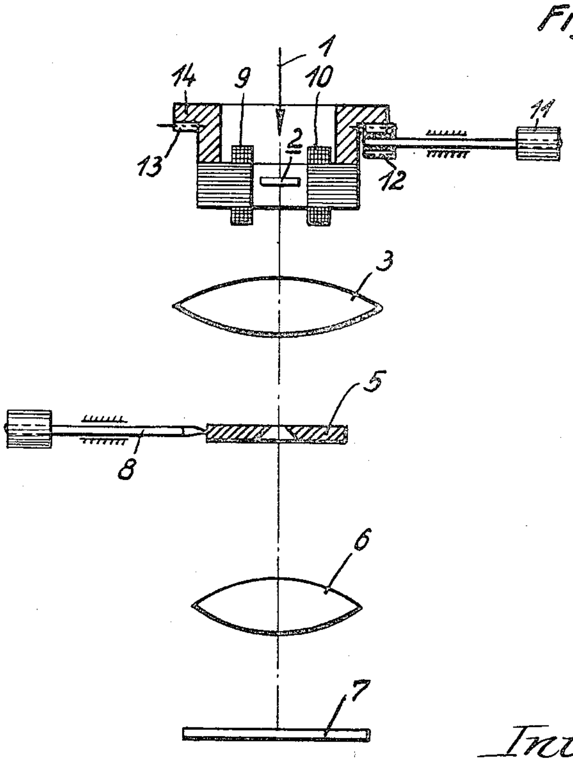

FIG. 1 illustrates in schematic manner the known method operating with channeled optical beam; and FIG. 2 shows in schematic manner an example of an embodiment of the invention.

Referring now to FIG. 1, the corpuscular beam 1, for example, the electron beam of an electron microscope, falls upon the thin layer 2 which has a plurality of magnetic regions 2′, 2″, etc. The spontaneous magnetization has in each of these regions a different direction. These directions are indicated by a circled x and a circled dot, respectively. Owing to the Lorentz force, the mutually parallel partial ray bundles of the beam 1, which permeate different magnetized regions 2′ and 2″, are deflected in different directions, so that they impact the objective 3 from different directions. The consequence is, that the different partial beams are after passing through the objective 3 focused in the focal plane at different focal points thereof. When the objective aperture diaphragm 5, which is disposed in the focal plane 4 of the objective 3, is now laterally shifted so that the focal point of a partial beam falls upon the rim of the diaphragm, such partial beam rays cannot anymore contribute to the picturing. In FIG. 1, this is the case in connection with the partial beam which permeates the magnetic region 2″, and such region will appear dark as compared with the region 2′, in the picture or image reproduced upon the fluorescent screen (not shown).

The particular features of the arrangement according to the present invention reside in that the specimen is subjected to the influence of a magnetic field which is as to magnitude and direction definitely determined, and that the specimen is pictured according to the schlieren optical beam method, wherein the bundles of parallel rays which are in the radiation direction beyond or underneath the specimen, are focused, and selectively excluded by diaphragm action.

It is advantageous to use a magnetic field the intensity or the direction of which is in defined manner variable. The use of a magnetic field in which both parameters are variable in defined manner, is particularly advantageous.

Since the spontaneous magnetization lies, in most materials which are here of interest, in the plane of the layer, the specimen is in most cases subjected to the influence of a magnetic field extending parallel to the specimen plane, such field being homogeneous at least in the specimen region which is being observed, so as to obtain definite investigation results.

In a preferred embodiment of a device according to the invention, there is provided in the specimen plane of the microscope, a coil arrangement comprising a suitable number of coils with or without iron core. A Helmholtz coil combination comprising ring coils, with a coil radius which is equal to the coil spacing, is appropriately provided to meet particular requirements with respect to the homogeneity of the magnetic field which is to be produced.

The excitation or energization of the coils is made so as to be variable in defined manner, for the purpose of producing a magnetic field with defined variable intensity; in case the direction of the magnetic field is also to be made variable, the holding means for the coil arrangement is appropriately constructed so that the coil arrangement is rotatable about an axis parallel to the corpuscular ray direction. The coil arrangement is for this purpose advantageously mounted upon an annular rotatable member provided with a scale.

It will be appreciated that the magnetic field thus produced does not only influence in desired manner the magnetic regions of the layers to be investigated, but also influences in undesired manner the corpuscular beam serving for the investigation, since the magnetic field effects a deflection of the corpuscular beam from the optical axis.

In accordance with a further feature, the invention therefore provides mechanical and/or magnetic and/or electrical means for directing to the specimen the corpuscular beam in a direction deviating from the optical axis, so that the beam, after running through the magnetic field, enters into the objective of the microscope parallel to the optical axis. So far as the principle is concerned, these means operate, as described in the copending application Ser. No. 189,472, filed Apr. 23, 1962, now Patent No. 3,182,195, so that the corpuscular beam is before impacting the specimen deflected by an angle which is equal to the angle of deflection caused by the magnetic field in the specimen plane, but acting in opposite direction.

The invention will now be described with reference to FIG. 2 showing in schematic manner an embodiment thereof. The parts already discussed in connection with FIG. 1 are in FIG. 2 identically referenced. The projective 6 has been shown in order to complete the representation of the imaging or picturing optics, numeral 7 indicating the fluorescent screen or photographic plate or film, disposed underneath the projective 6. The objective aperture diaphragm 5 is displaceable or adjustable by means of the actuating member 8, whereby the focal points of the individual partial beam bundles can be selectively excluded.

According to the invention, there is provided in the plane of the specimen 2 a coil arrangement for producing a magnetic field which is definite as to magnitude and direction, such field being formed by two magnet coils 9 and 10. The intensity of the homogeneous magnetic field thus produced, which field extends in the direction of the thin layer to be examined, can be varied in defined manner by variation of the energization of the coils 9 and 10 by suitable means (not shown). The direction of the magnetic field is likewise variable in defined manner by means of the adjusting member 11 which acts on the adjusting member 14 for the coils 9 and 10, over the pinion 12 meshing with the toothed part 13 of the adjusting member. The coil arrangement is accordingly rotatable about an axis parallel to the corpuscular ray direction and is mounted on the rotatable member 14 which is for easy indication provided with a suitable scale.

Changes may be made within the scope and spirit of the appended claims which define what is believed to be new and desired to have protected by Letters Patent.

I claim:

1. A device for investigating, with the aid of a corpuscular beam microscope, magnetic regions in thin material specimen by transirradiation, with such microscope having disposed in the beam path thereof, a specimen holder, objective lens means, projective lens means and image viewing means, with beams of rays passing through such a specimen being focused in a common focal plane following passage through said objective lens means, the beams which have passed through differently magnetized regions of the specimen having different focal points as a result thereof, comprising a diaphragm disposed at said focal plane and movable in directions parallel thereto operable to selectively block further passage of rays at focal points representing undesired regions of the specimen, and a coil arrangement disposed to produce a magnetic field at said specimen holder, to which such a specimen therein would be subjected.

2. A device according to claim 1, wherein said coil arrangement is mounted for rotation about an axis extending parallel to the direction of the corpuscular beam.

3. A device according to claim 2, wherein said coil arrangement is mounted on a turn table provided with a dial for indicating the position thereof.

4. A device according to claim 1, wherein said coil arrangement comprises a Helmholtz coil combination consisting of ring coils with a coil radius which is equal to the coil spacing.

5. A device according to claim 1, wherein said coil arrangement comprises a Helmholtz coil combination consisting of ring coils with a coil radius which is equal to the coil spacing, and means for varying in defined manner the energization of said coil combination.

6. A device according to claim 1, comprising means for rotating said coil means about an axis extending parallel to the beam radiation direction for the purpose of varying the direction of said magnetic field.

7. A device according to claim 6, comprising an annular rotatable scale-bearing member for supporting said coil means.

8. A device according to claim 1, comprising means for directing the beam to the specimen in a direction which deviates from the optical axis, said beam, after running through the magnetic field, entering the objective of the microscope parallel to the optical axis.

References Cited

UNITED STATES PATENTS 2,494,442 1/1950 Le Poole.
2,993,993 7/1961 Delong, et al.

OTHER REFERENCES

"Determination of Magnetization Distribution in Thin Films Using Electron Microscopy" by H. W. Fuller, et al., from "Journal of Applied Physics," vol. 31, No. 2. February 1960, pp. 238–248.

WILLIAM F. LINDQUIST, *Primary Examiner.*